US011484995B2

(12) United States Patent
Huffines

(10) Patent No.: US 11,484,995 B2
(45) Date of Patent: Nov. 1, 2022

(54) CONDUIT CONNECTOR TOOL

(71) Applicant: Anthony, Inc., Sylmar, CA (US)

(72) Inventor: Kenneth Wilson Huffines, Covington, GA (US)

(73) Assignee: Anthony, Inc., Sylmar (CA)

( * ) Notice: Subject to any disclaimer, the term of this patent is extended or adjusted under 35 U.S.C. 154(b) by 308 days.

(21) Appl. No.: 16/868,697

(22) Filed: May 7, 2020

(65) Prior Publication Data
US 2021/0347018 A1 Nov. 11, 2021

(51) Int. Cl.
*B25B 13/50* (2006.01)
*H02G 3/04* (2006.01)

(52) U.S. Cl.
CPC .............. *B25B 13/50* (2013.01); *H02G 3/04* (2013.01)

(58) Field of Classification Search
CPC ....... B25B 13/48; B25B 13/50; B25B 13/065; H02G 3/04
See application file for complete search history.

(56) References Cited

U.S. PATENT DOCUMENTS

| 6,196,091 B1* | 3/2001 | Khokhar | B25B 13/48 81/460 |
| 8,701,526 B2* | 4/2014 | Scott | B25B 13/065 81/124.6 |
| 2013/0312575 A1* | 11/2013 | Ong | B25B 13/50 81/176.1 |

* cited by examiner

*Primary Examiner* — David B. Thomas
(74) *Attorney, Agent, or Firm* — Fish & Richardson P.C.

(57) ABSTRACT

The subject matter described in this specification relates generally to a tool for installing a flexible metal conduit screw-in connector onto a flexible metal conduit and a method for installing the flexible metal conduit connector tool. The flexible metal conduit screw-in connector tool includes a handle, a centering rod, and two studs. The flexible metal conduit connector tool is to engage a flexible metal conduit screw-in connector.

19 Claims, 5 Drawing Sheets

CONDUIT CONNECTOR TOOL

TECHNICAL FIELD

This invention relates to tools for attaching fittings to flexible metal conduit.

BACKGROUND

Flexible metal conduit is commonly used throughout building construction to route and protect electrical wiring. Flexible metal conduit connectors join flexible metal conduit to electrical junction boxes, and connect lengths of conduit, for example. Some flexible metal conduit connectors screw into the flexible metal conduit. Flexible metal conduit can be cut to a desired length during the building construction process. Flexible metal conduit cutting operations often leave sharp burrs causing handling and safety concerns. Improvements are sought in tool design to address these and other issues.

SUMMARY

One broad aspect of the invention features a tool for attaching a fitting to a flexible metal conduit. The tool includes a handle, a first stud and a second stud, and a rod. The first stud and a second stud each extend from a front surface of the handle. An inner face of the first stud faces an inner face of the second stud. The inner face of the first stud and the inner face of the second stud interface with the fitting. The rod extends from the front surface of the handle.

In some implementations, at least one stud is moveable with respect to the front surface of the handle to permit alteration of a distance between the two studs.

In some implementations, the tool is constructed from a metal material.

In some implementations, the tool is constructed from a plastic material.

In some implementations, the handle is constructed of a plastic material and the studs are constructed of a metal material.

In some implementations, the back surface of the handle includes an interface for connecting an extension tool.

In some implementations, the interface on the back surface includes a socket connection or a hex connection.

In some implementations, an edge of the handle is ribbed.

In some implementations, the handle is cylindrical.

Another aspect of the invention features a tool for attaching fittings to conduit. The tool includes a body, a first stud, a second stud, and a projection. The body has a front surface. The first stud includes a flat face and extends outward from the front surface of the body. The second stud includes a flat face and extends outward from the front surface of the body. The projection is positioned between the first stud and the second stud and extends outward from the front surface of the body. The projection is sized to fit through a center hole of a conduit fitting.

In some implementations, the first stud and the second stud are arranged on the front surface of the body such that the flat face of the first stud and the flat face of the second stud are across from one another with the projection positioned in between.

In some implementations, the body includes a ratcheting mechanism coupled to at least one stud. The ratcheting mechanism is arranged to permit a user to vary a distance between the first stud and the second stud.

In some implementations, at least stud is moveable with respect to the front surface of the handle permitting alteration of a distance between the two studs.

In some implementations, the tool is constructed from a metal material.

In some implementations, the tool is constructed from a plastic material.

In some implementations, the tool is constructed of multiple materials.

In some implementations, a back surface of the handle includes an interface for connecting an extension tool.

In some implementations, the interface includes a socket connection or a hex connection.

Another aspect of the invention features a kit including a set of fitting attachment tools. Each fitting attachment tool includes a body, a first stud, a second stud, and a projection. The body has a front surface. The first stud extends outward from the front surface of the body. The second stud extends outward from the front surface of the body. The projection extends outward from the front surface of the body and is positioned between the first stud and the second stud. Each fitting tool includes a different spacing between its respective first stud and second stud.

The concepts described herein may provide several advantages. For example, implementations of the present disclosure may provide better control of a fitting during installation. For example, implementations of the present disclosure move a worker's hand away from the burr, improving worker safety.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
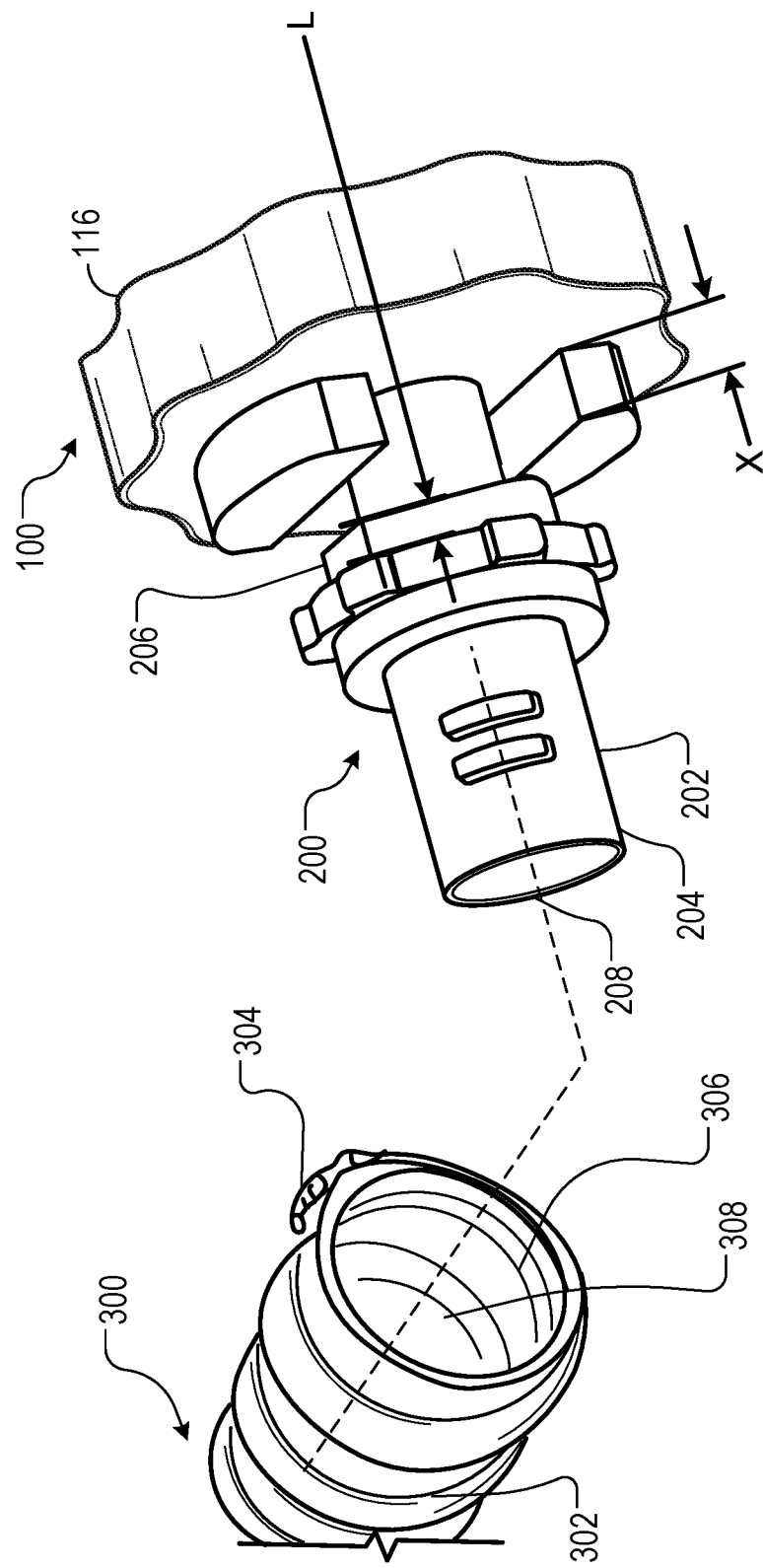
FIG. 1 depicts a flexible metal conduit, a flexible metal conduit connector, and a flexible metal conduit connector tool.

Implementations of the present disclosure are generally directed to a tool for installing a screw-in connector fitting to a flexible metal conduit (FMC). The tool includes a handle, two studs that extend outward from the handle to engage the indentions on the screw-in connector fitting, and a centering rod. The rear face of the handle has a fitting cavity that can accept an extension tool.

FIGS. 1-4 depict various views of a FMC fitting tool 100 in accordance with implementations of the present disclosure. The FMC fitting tool 100 includes a handle 102, two or more studs 104a, 104b, and a centering rod 106. The handle 102 has a front surface 108, a side surface 110, and a back surface 112. The side surface 110 extends from the plane of the front surface 108 and is terminated by the plane of the back surface 112. The studs 104a and 104b extend from the front surface 108 and are configured to engage the fitting 200. The centering rod 106 extends from the front surface 108 and is positioned in between the studs 104a and 104b.

In some implementations, the handle 102 side surface 110 is textured. The texturing may be knurled, dimpled, crosshatched, circular, or geometric. The side surface 110 texturing increases friction between the user's hand and the FMC fitting tool 100 to improve control of the FMC fitting tool 100. The handle 102 can have a ribbed, round, square, octagonal, or other geometric cross-section.

Studs 104a and 104b extend from the front surface 108 of the handle. Centering rod 106 sits in between the studs 104a and 104b and slides into the FMC screw-in connector inner cavity 208. The centering rod 106 can have a round, square, octagonal, or other geometric cross-section. The surface of the centering rod 104 can be threaded. The centering rod 106 aligns the FMC fitting tool to the FMC screw-in connector fitting 200.

The FMC fitting tool 100 is rotated to align the FMC screw-in connector tool 100 studs 104a and 104b with FMC screw-in connector flats 206a. The screw-in connector tool 100 studs 104a and 104b can couple with the FMC screw-in connector flats 206.

In some implementations, the studs 104a, 104b can be longer than the flats 206 on common fittings 200 to provide additional distance between a user's fingers and sharp edges of a conduit 300. For example, the studs 104a 104b can extend a distance (X) away from the front surface 108 of the handle 102 that is larger than a length (L) of the flats 206.

Figure 3:
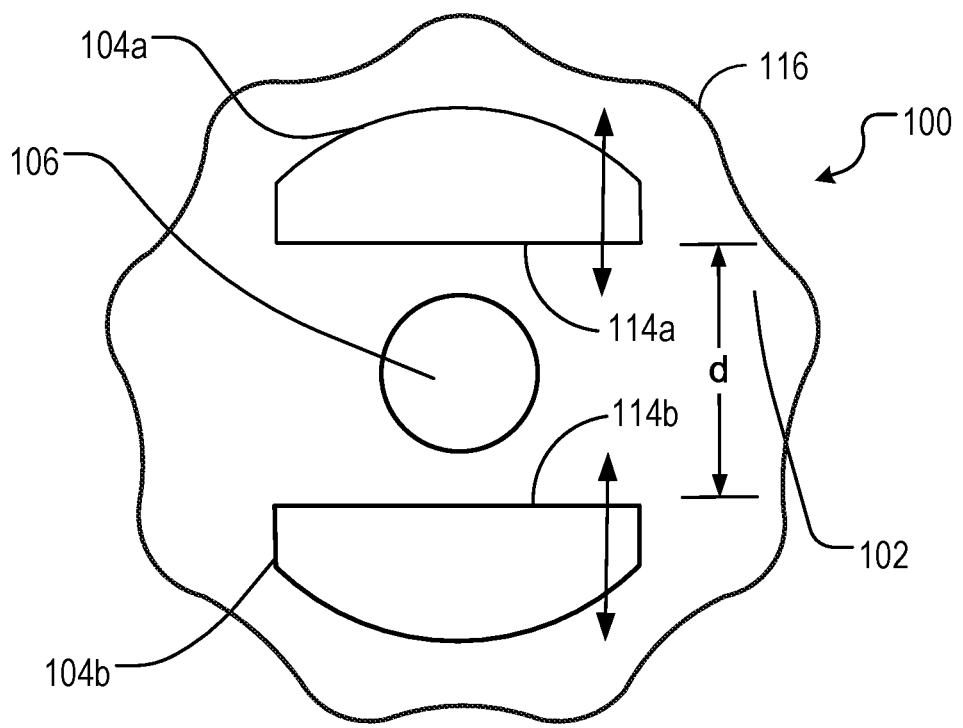
FIG. 3 depicts a front view of the flexible metal coupling connector tool.

In some implementations, the studs 104a and 104b are adjustably movable radially across the front face 108 of the handle 102 (e.g., as indicated by the double arrows in FIG. 3). The distance (d) between the studs 104a and 104b adjust to fit various size fittings 200. For example, one or both of the studs 104a and 104b can slide in groves or elongated openings on the face 108 of the handle 102. In some implementations, a ratcheting mechanism can be disposed within the handle. The studs 104a and 104b can be coupled to the ratcheting mechanism permitting the distance (d) between studs 104a and 104b to be adjusted and while also allowing the studs 104a and 104b to be temporarily locked in place during use.

Some implementations can include a kit of multiple FMC tools 100 with each FMC tool having a different spacing (d) between the studs 104a and 104b. For example, the flats of FMC fittings 200 can be an English or metric standard size such as ½", ⅝', 13 mm, or 16 mm. An FMC tool kit can include four FMC tools 100 with spacing's (d) between the studs 104a and 104b of ½", ⅝', 13 mm, and 16 mm.

FIG. 1 shows the FMC fitting tool 100 engaging with a fitting 200. The FMC fitting tool 100 centering rod 106 center axis is aligned with a FMC screw-in connector inner cavity 208 center axis. The FMC fitting tool 100 moves toward the fitting 200, engaging the studs 104a and 104b inner surfaces 114a and 114b with the fitting flats 206. The FMC fitting tool 110 front surface 108 seats against the fitting 200. The FMC fitting tool 100 and fitting 200 are combined in a unitary body. The fitting 200 has threads 202 on an outer surface 204. The FMC screw-in connector threads 202 are configured to engage and couple with the FMC inner surface 306. The FMC screw-in connector 200 has an inner cavity 208 that aligns with and opens to the FMC inner cavity 308 to allow electrical wiring to pass through. The fitting 200 center axis is aligned with the FMC 300 center axis. The FMC fitting tool 100/fitting 200 moves toward the FMC 300, with the fitting 200 threads 202 engaging the fitting 200 placed within the slides into the FMC inner surface 306 and is rotated to lock the fitting 200 into the FMC 300.

The FMC 300 has a spiral wound structural surface 302 that facilitates bending and routing in building construction. The FMC 300 is cut to a length prior to installation in building construction. The cutting to length process is accomplished by a device that cuts or shears the FMC in a plane approximately perpendicular to the longitudinal axis of the FMC 300. The cutting or shearing forces applied across the spiral-structured surface 302 can create a metal burr 304. The metal burr 304 can vary in width, length, and orientation. The metal burr 304 can have a sharp geometry that creates a safety hazard for a person's hands during the installation of the fittings 200 on the FMC 300. Safety hazards include abrasive wounds, puncture wounds, and burrs 304 snagging on clothing or equipment.

FMC tool 100 is constructed to prevent cuts and other injuries to one's fingers when attaching fittings 200 to cut ends of metal conduit 300. For example, FMC tool 100 permits a user to screw fittings 200 into an end of a metal conduit 300 while keeping the user's fingers safely away from any burrs 304 that might cause injury. Specifically, the FMC tool 100 is configured to engage with the flats 206 on a fitting 300 to provide the torque necessary for screwing the fitting into conduit 300 while keeping a user's fingers away from sharp edges of the conduit 300. For instance, the handle 102 can be constructed larger than a diameter of the conduit 200, thereby, keeping the user's fingers at a sufficient distance form any burrs 304 while using the FMC tool 100 to attach a fitting 100. The studs 104a, 104b of the FMC tool 200 are configured to engage with flats 206 on fitting 200 to transfer force and rotational motion from the user to the fitting 100 causing the fitting 200 to engage and couple with the FMC 300. Additionally, centering rod 106 of the FMC tool 100 is configured to align with the inner cavity 208 of the fitting 200. For example, the centering rod 106 may be used to aid with aligning the fitting 200 with the conduit 300. In addition, the centering rod 106 may allow a user to place a fitting on the FMC tool 100 without the fitting 200 falling off the tool so the user can have a free hand to hold the conduit while aligning and attaching the fitting 200.

Figure 2:
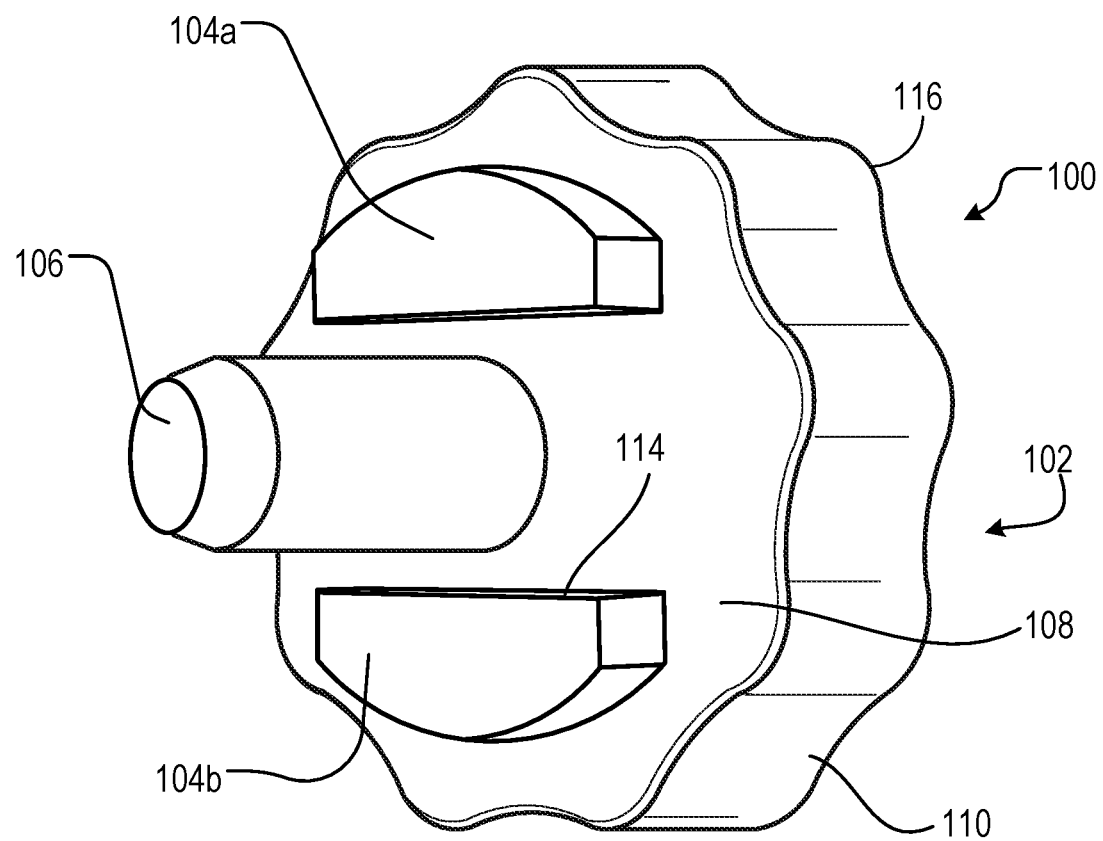
FIG. 2 depicts a perspective view of the flexible metal coupling connector tool.

FIG. 2 shows a perspective view of an exemplary FMC screw-in connector tool from the front. Handle 102 has a front surface 108 and a back surface 112 that are circular. The handle 102 side surface 110 is ribbed (e.g., the handle side surface has rounded protrusions 116 extending outwards around its perimeter). In some implementations, the handle 102 side surface 110 can be textured or knurled. The centering rod 106 is smooth. In some implementations, the centering rod 106 can be textured or threaded.

FIG. 3 shows a front view of an exemplary FMC screw-in connector tool 100. Studs 104a and 104b extend from the front surface 108 of the handle. Centering rod 106 sits in between the studs 104a and 104b and slides into the FMC inner cavity (208 of FIG. 1).

Figure 4:
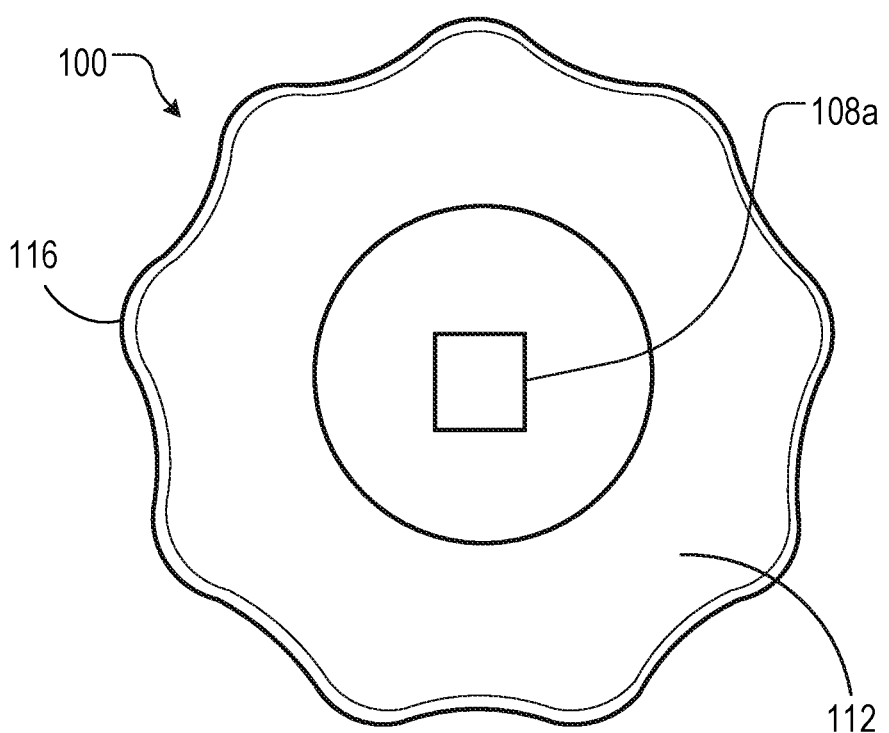
FIG. 4 depicts a rear view of the flexible metal coupling connector tool.

FIG. 4 shows a back view of a FMC fitting tool 100. Fitting 108a at the center of the handle rear side is configured to accept an extension tool. In some implementations, the rear face 110 of the handle can have variously different shaped or sized fittings 108a-108b to accept different types of extension tools.

Figure 5A:
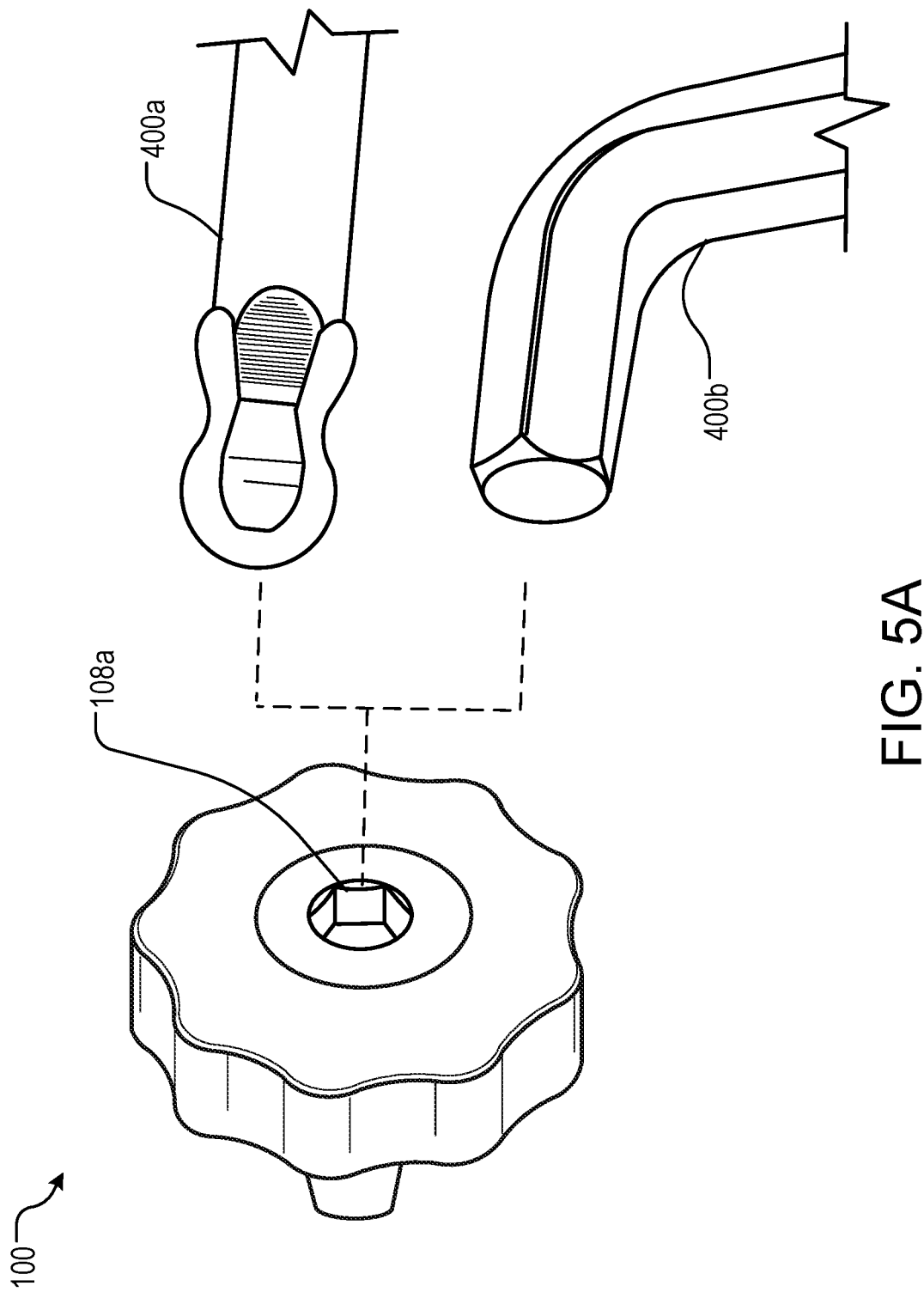
FIGS. 5A and 5B each depict a perspective view of an attachable extension tool aligned to attach to the flexible metal conduit connector tool.
Figure 5B:
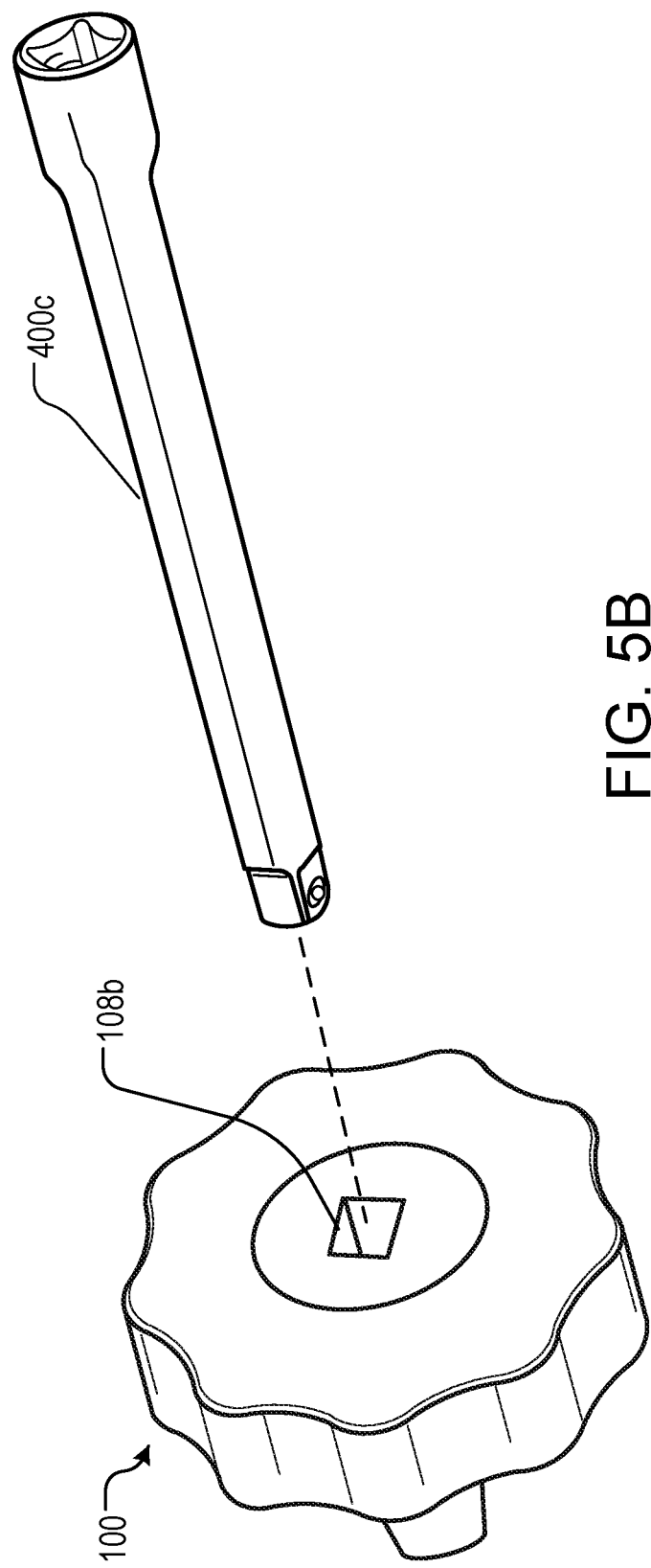

FIGS. 5A and 5B depict a back perspective view of the flexible metal conduit screw-in connector tool 100 handle 102. FIG. 5a depicts fitting 108a configured hexagonally to accept a rounded hexagonal extension tool 400a or a flat hexagonal extension tool 400b. FIG. 5b depicts fitting 108b configured square-shaped to accept a standard socket extension bar. For example, the socket extension bar may have a side dimension of ¼ inches, ⅜ inches, or ½ inches.

In some implementations, the FMC fitting tool 100 is manufactured from a single piece of metal stock. For example, the FMC fitting tool can be manufactured from steel, aluminum, or zinc alloy such as Zamak3 or Zamak5. In some implementations, the FMC fitting tool 100 is manufactured from a single piece of plastic stock. For example, the FMC fitting tool 100 can be manufactured from nylon, acetal resins [Delrin®, Acrylonitrile Butadiene Styrene (ABS), or Polycarbonate (PC)], or an ABS+PC blend. In some implementations, the FMC fitting tool 100 manufactured from multiple pieces of metal stock (e.g. steel and aluminum). In some implementations, the FMC fitting tool 100 is manufactured from multiple pieces of metal and plastic stock (e.g. steel and plastic).

While a number of examples have been described for illustration purposes, the foregoing description is not intended to limit the scope of the invention, which is defined by the scope of the appended claims. There are and will be other examples and modifications within the scope of the following claims.

What is claimed is:

1. A tool for attaching a fitting to a flexible metal conduit, the tool comprising:
   a handle;
   a first stud and a second stud, each extending from a front surface of the handle;
   an inner face of the first stud facing an inner face of the second stud, wherein the inner face of the first stud and the inner face of the second stud are configured to interface with the fitting; and
   a rod extending from the front surface of the handle.

2. The tool of claim 1, wherein at least one of the first stud and the second stud is moveable with respect to the front surface of the handle, thereby, permitting alteration of a distance between the first stud and the second stud.

3. The tool of claim 1, wherein the tool is constructed from a metal material.

4. The tool of claim 1, wherein the tool is constructed from a plastic material.

5. The tool of claim 1, wherein the handle is constructed of a plastic material and the studs are constructed of a metal material.

6. The tool of claim 1, wherein a back surface of the handle comprises an interface for connecting an extension tool.

7. The tool of claim 6, wherein the interface comprises a socket connection or a hex connection.

8. The tool of claim 1, wherein an edge of the handle is ribbed.

9. The tool of claim 1, wherein the handle is cylindrical.

10. A tool for attaching fittings to conduit, the tool comprising:
    a body having a front surface;
    a first stud extending outward from the front surface of the body, the first stud comprising a flat face;
    a second stud extending outward from the front surface of the body, the second stud comprising a flat face; and
    a projection extending outward from the front surface of the body, wherein the projection is positioned between the first stud and the second stud, and wherein the projection is sized to fit through a center hole of a conduit fitting.

11. The tool of claim 10, wherein the first stud and the second stud are arranged on the front surface of the body such that the flat face of the first stud and the flat face of the second stud are across from one another with the projection positioned there between.

12. The tool of claim 10, wherein the body comprises a ratcheting mechanism coupled to at least one of the first stud and the second stud, the ratcheting mechanism arranged to permit a user to vary a distance between the first stud and the second stud.

13. The tool of claim 10, wherein at least one of the first stud and the second stud is moveable with respect to the front surface of a handle, thereby, permitting alteration of a distance between the first stud and the second stud.

14. The tool of claim 10, wherein the tool is constructed from a metal material.

15. The tool of claim 10, wherein the tool is constructed from a plastic material.

16. The tool of claim 10, where the tool is constructed of multiple materials.

17. The tool of claim 10, wherein a back surface of the handle comprises an interface for connecting an extension tool.

18. The tool of claim 17, wherein the interface comprises a socket connection or a hex connection.

19. A kit comprising:
    a set of fitting attachment tools, each fitting attachment tool comprising:
      a body having a front surface,
      a first stud extending outward from the front surface of the body,
      a second stud extending outward from the front surface of the body, and
      a projection extending outward from the front surface of the body,
      wherein the projection is positioned between the first stud and the second stud, and
    wherein each fitting tool comprises a different spacing between its respective first stud and second stud.

* * * * *